(12) United States Patent
Norfolk et al.

(10) Patent No.: US 9,446,475 B2
(45) Date of Patent: Sep. 20, 2016

(54) WELD ASSEMBLY FOR ULTRASONIC ADDITIVE MANUFACTURING APPLICATIONS

(71) Applicants: Mark Norfolk, Columbus, OH (US); David Bartholomew, Cuyahoga Falls, OH (US); Charles Sidlosky, Cuyahoga Falls, OH (US)

(72) Inventors: Mark Norfolk, Columbus, OH (US); David Bartholomew, Cuyahoga Falls, OH (US); Charles Sidlosky, Cuyahoga Falls, OH (US)

(73) Assignee: FABRISONIC, LLC, Columbus, OH (US)

( * ) Notice: Subject to any disclaimer, the term of this patent is extended or adjusted under 35 U.S.C. 154(b) by 0 days.

(21) Appl. No.: 14/248,842

(22) Filed: Apr. 9, 2014

(65) Prior Publication Data

US 2015/0290711 A1    Oct. 15, 2015

(51) Int. Cl.
| | |
|---|---|
| *B22F 3/00* | (2006.01) |
| *B22F 3/10* | (2006.01) |
| *B22F 9/04* | (2006.01) |
| *B23K 20/10* | (2006.01) |
| *B23K 35/02* | (2006.01) |

(Continued)

(52) U.S. Cl.
CPC ......... *B23K 20/103* (2013.01); *B23K 35/0233* (2013.01); *B22F 3/003* (2013.01); *B22F 3/10* (2013.01); *B22F 9/04* (2013.01); *B23K 20/10* (2013.01); *B29C 67/0074* (2013.01); *B33Y 30/00* (2014.12)

(58) Field of Classification Search
CPC ........ B33Y 30/00; B22F 3/093; B22F 3/003; B22F 3/10; B22F 9/04; B29C 65/082; B29C 67/0085; B29C 67/0074

USPC ......................................... 425/78; 228/110.1
See application file for complete search history.

(56) References Cited

U.S. PATENT DOCUMENTS 3,607,580 A *  9/1971  Obeda ................... B29C 65/08
                                                156/580.1
5,207,371 A *  5/1993  Prinz et al. ................... 228/125

(Continued)

FOREIGN PATENT DOCUMENTS

| CA | 2466774 A1 * | 4/2005 | |
| DE | 3916315 A1 * | 11/1990 | ............. B23B 31/02 |

OTHER PUBLICATIONS

International Search Report and the Written Opinion of the International Searching Authority, or the Declaration received in PCT/US15/25044; mail date Jul. 2, 2015.

*Primary Examiner* — Alison L Hindenlang
*Assistant Examiner* — Jerzi H Moreno Hernandez
(74) *Attorney, Agent, or Firm* — McNees Wallace & Nurick LLC

(57) ABSTRACT

A system for use in ultrasonic additive manufacturing processes, comprising a milling machine or the like and a weld assembly. The milling machine further includes a spindle adapted to receive a milling tool, wherein the spindle is capable of moving in the z-axis direction; and a table positioned beneath the spindle, wherein the table is capable of moving in the x-axis direction and the y-axis direction. The weld assembly is adapted to be mounted on the spindle of the milling machine and further includes an ultrasonic weld head; a tapered tool shank adapted to connect the weld assembly to the spindle; and a unique mating collar disposed between the ultrasonic weld head and the spindle, wherein the mating collar is operative transfer thrust loads associated with ultrasonic additive manufacturing processes from the ultrasonic weld head to the z-axis of the spindle without damaging the spindle or other components of the machine.

20 Claims, 3 Drawing Sheets

(51) Int. Cl.
*B33Y 30/00* (2015.01)
*B29C 67/00* (2006.01)

(56) References Cited

U.S. PATENT DOCUMENTS

| | | | |
|---|---|---|---|
| 5,947,364 A * | 9/1999 | Tamura | B23K 20/106 156/580.2 |
| 2001/0049984 A1 * | 12/2001 | Matsumoto et al. | 82/152 |
| 2002/0019683 A1 * | 2/2002 | White et al. | 700/255 |
| 2004/0021276 A1 | 2/2004 | Allan et al. | |
| 2006/0273140 A1 * | 12/2006 | Ghosh | 228/112.1 |
| 2010/0162544 A1 * | 7/2010 | Sassatelli et al. | 29/23.51 |
| 2011/0168331 A1 * | 7/2011 | Storm | B23K 20/106 156/349 |
| 2011/0220292 A1 * | 9/2011 | Short | B23K 20/103 156/580.1 |
| 2012/0153006 A1 * | 6/2012 | Koetting | B23K 20/10 228/102 |

* cited by examiner

WELD ASSEMBLY FOR ULTRASONIC ADDITIVE MANUFACTURING APPLICATIONS

BACKGROUND OF THE INVENTION

The described invention relates in general to ultrasonic welding systems and more specifically to a system and apparatus for providing increased stroke utilization for ultrasonic additive manufacturing machines and applications.

Ultrasonic welding is an industrial process involving high-frequency ultrasonic acoustic vibrations that are locally applied to workpieces being held together under pressure to create a solid-state weld. This process has applications in the electrical/electronic, automotive, aerospace, appliance, and medical industries and is commonly used for plastics and especially for joining dissimilar materials. Ultrasonic welding of thermoplastics results in local melting of the plastic due to absorption of vibration energy. The vibrations are introduced across the joint to be welded. In metals, ultrasonic welding occurs due to high-pressure dispersion of surface oxides and local motion of the materials. Although there is heating, it is not enough to melt the base materials. Vibrations are introduced along the joint being welded.

Ultrasonic welding systems typically include the following components: (i) a press to apply pressure to the two parts to be assembled under pressure; (ii) a nest or anvil where the parts are placed for allowing high frequency vibration to be directed to the interfaces of the parts; (iii) an ultrasonic stack that includes a converter or piezoelectric transducer for converting the electrical signal into a mechanical vibration, an optional booster for modifiying the amplitude of the vibration (it is also used in standard systems to clamp the stack in the press), and a sonotrode or horn for applying the mechanical vibration to the parts to be welded (note: all three components of the stack are specifically tuned to resonate at the same exact ultrasonic frequency which is typically 20, 30, 35 or 40 kHz); (iv) an electronic ultrasonic generator or power supply delivering a high power AC signal with frequency matching the resonance frequency of the stack; and (v) a controller for controlling the movement of the press and the delivery of the ultrasonic energy.

In an exemplary system, a power supply provides high-frequency electrical power to the piezoelectric-based transducer, creating a high-frequency mechanical vibration at the end of the transducer. This vibration is transmitted through the booster section, which may be designed to amplify the vibration, and is then transmitted to the sonotrode, which transmits the vibrations to the workpieces. The workpieces, usually two thin sheets of metal in a simple lap joint, are firmly clamped between the sonotrode and a rigid anvil by a static force. The top workpiece is gripped against the moving sonotrode by a knurled pattern on the sonotrode surface. Likewise, the bottom workpiece is gripped against the anvil by a knurled pattern on the anvil. The ultrasonic vibrations of the sonotrode, which are parallel to the workpiece surfaces, create the relative frictionlike motion between the interface of the workpieces, causing the deformation, shearing, and flattening of surface asperities. Welding system components, commonly referred to as the transmission line or "stack" are typically housed in an enclosure case that grips the welding assembly at critical locations (most commonly the anti-node) so as to not dampen the ultrasonic vibrations, and to provide a means of applying a force to and moving the assembly to bring the sonotrode into contact with the workpieces and apply the static force. Sonotrodes are typically made of titanium, aluminum or steel and for an ultrasonic welding application, the sonotrode provides energy directly to the welding contact area.

Ultrasonic additive manufacturing (UAM) is an additive manufacturing technique that involves building up solid metal objects through ultrasonically welding successive layers of thin metal tape into a three-dimensional shape, with periodic machining operations to create the detailed features of the resultant object. UAM can also be characterized as a solid-state metal deposition process that allows build-up or net-shape fabrication of metal components. High-frequency (typically 20,000 hertz) ultrasonic vibrations are locally applied to metal foil materials, held together under pressure, to create a solid-state weld. The key features of the process include a rolling ultrasonic welding system, consisting of an ultrasonic transducer, a booster, the (welding) horn, and a second "dummy" booster. The vibrations of the transducer are transmitted to a disk-shaped welding horn (i.e., the sonotrode) rolling in the x-direction, and from there to the tape-metal base, which creates an ultrasonic solid-state weld between the thin metal tape and a base plate. The continuous rolling of the horn over the tape welds the entire tape to the plate. By welding a succession of tapes, first side by side, then one on top of the other (but staggered so that seams do not overlap), it becomes possible to build a solid metal part. Through the course of the build, there will be periodic machining operations, using an integrated computer numerically controlled (CNC) system, to add features to the part, to remove excess tape material, and to true up the topmost surface of the part. This process is repeated until a solid component has been created or a feature is repaired or added to a component. Thus, the process involves subtractive as well as additive steps. Numerous applications for UAM have been identified, including rapid prototyping, low volume tooling, direct parts manufacture, tailored materials, metal matrix composites, embedded fibers, smart materials, sensors, cladding, armor and thermal management. Specific examples include injection mold dies, embedded channels for thermal management or chemical processing, and the embedding of materials, e.g. wires, tapes or meshes, within a metal matrix. UAM can also join dissimilar metal materials of different thicknesses and allow for the embedment of fiber materials at relatively low temperature, (typically <50% of the metal matrix melting temperature) and pressure into solid metal matrices.

Most, if not all, UAM machines utilize a moving x-y table for providing motion during ultrasonic welding operations. This table is positioned beneath both a fixed machining head (mounted on a machining spindle) and a fixed welding head and on traditional UAM machines, the machining spindle and the welding head are located on separate z-axes. The physical distance between the centerline of the machining spindle and the centerline of the weld head creates two zones on the table that cannot be accessed by both pieces of crucial equipment. Thus, a wasted zone of travel equal to two times the distance between the centerline of the machining spindle and the centerline of the weld head is created by this common configuration, which significantly limits the size of the parts that may be built using these UAM machines. Thus, there is an ongoing need for a system and assembly for use in UAM applications that does not create this wasted zone of travel and that permits larger parts to be built using the UAM process.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first system for use in ultrasonic additive manufacturing processes is provided. This system includes a milling machine and a weld assembly. The milling machine further includes a spindle adapted to receive a milling tool, wherein the spindle is capable of moving in the z-axis direction; and a table positioned beneath the spindle, wherein the table is capable of moving in the x-axis direction and the y-axis direction. The weld assembly is adapted to be mounted on the spindle of the milling machine and further includes an ultrasonic weld head; a tapered tool shank adapted to connect the weld assembly to the spindle; and a mating collar disposed between the ultrasonic weld head and the spindle, wherein the mating collar is operative to transfer thrust loads associated with ultrasonic additive manufacturing processes from the ultrasonic weld head to the z-axis of the spindle without damaging the spindle; and wherein the mating collar further includes a predetermined surface area for achieving sufficient load transfer, parallelism to the milling machine z-axis for preventing side loading, and substantial flatness of the top surface thereof for even load transfer.

In accordance with another aspect of the present invention, a second system for use in ultrasonic additive manufacturing processes is provided. This system includes a computer numerical controlled milling machine, a weld assembly, and a source of metal foil tape in communication with the weld assembly. The computer numerical controlled milling machine further includes a spindle adapted to receive a milling tool, wherein the spindle is capable of moving in the z-axis direction; and a table positioned beneath the spindle, wherein the table is capable of moving in the x-axis direction and the y-axis direction. The weld assembly is adapted to be mounted on the spindle of the milling machine, and further includes an ultrasonic weld head; a tapered tool shank adapted to connect the weld assembly to the spindle; and a mating collar disposed between the ultrasonic weld head and the spindle, wherein the mating collar is operative to transfer thrust loads associated with ultrasonic additive manufacturing processes from the ultrasonic weld head to the z-axis of the spindle without damaging the spindle; and wherein the mating collar further includes a predetermined surface area for achieving sufficient load transfer, parallelism to the milling machine z-axis for preventing side loading, and substantial flatness of the upper surface thereof for even load transfer.

In yet another aspect of this invention, a third system for use in ultrasonic additive manufacturing processes is provided. This system includes a milling machine, a weld assembly, a source of metal foil tape in communication with the weld assembly, and an apparatus for feeding the metal foil tape to the weld assembly during ultrasonic additive manufacturing processes. The computer numerical controlled milling machine further includes a spindle adapted to receive a milling tool, wherein the spindle is capable of moving in the z-axis direction; and a table positioned beneath the spindle, wherein the table is capable of moving in the x-axis direction and the y-axis direction. The weld assembly is adapted to be mounted on the spindle of the milling machine, and further includes an ultrasonic weld head; a tapered tool shank adapted to connect the weld assembly to the spindle; and a mating collar disposed between the ultrasonic weld head and the spindle, wherein the mating collar is operative to transfer thrust loads associated with ultrasonic additive manufacturing processes from the ultrasonic weld head to the z-axis of the spindle without damaging the spindle; and wherein the mating collar further includes a predetermined surface area for achieving sufficient load transfer, parallelism to the milling machine z-axis for preventing side loading, and substantial flatness of the upper surface thereof for even load transfer.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1A:
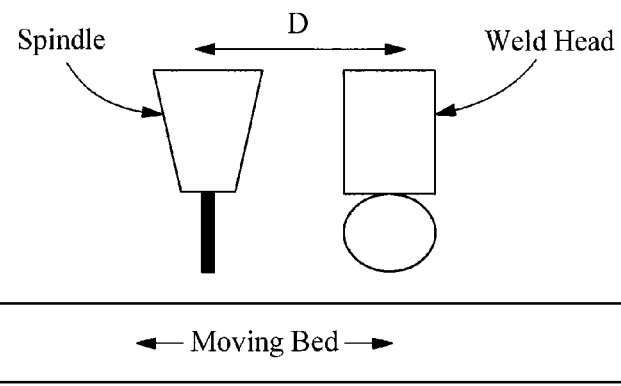
FIG. 1a-1b are schematic illustrations of prior art UAM systems wherein the milling spindle and weld assembly are configured as separate devices, thereby resulting in the wasted travel space of distance "D"

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously indicated, the present invention relates in general to ultrasonic welding systems and more specifically to a system and apparatus for providing increased stroke utilization for ultrasonic additive manufacturing machines and applications. Ultrasonic additive manufacturing (UAM) is an additive manufacturing technique that involves ultrasonic welding of metal foils and computer numerically controlled (CNC) contour milling. Milling, a machining process that uses rotary cutters to remove material from a workpiece while advancing (or feeding) in a direction at an angle with the axis of the cutting tool, is one of the most commonly used processes in industry for machining precision parts. Milling operates on the principle of rotary motion, wherein a milling cutter is spun about an axis while a workpiece is advanced through it in such a way that the blades of the cutter are able to shave off pieces of material with each pass. Milling processes are designed such that the cutter makes many individual cuts on the material in a single run by using a cutter with many teeth, spinning the cutter at high speed, advancing the material through the cutter slowly, or by a combination of these approaches. The speed at which the piece advances through the cutter is called feed rate, or just feed; it is most often measured in length of material per full revolution of the cutter. As will be appreciated by one of ordinary skill in the art, a typical milling machine includes a tool such as milling cutter attached to a spindle, a top slide or overarm, a support column, a table capable of moving in one or more directions, and base. In a vertical mill the spindle axis is vertically oriented. Milling cutters are held in the spindle and rotate on the axis of the spindle. The spindle can generally be extended (or the table can be raised/lowered, giving the same effect), allowing plunge cuts and drilling.

Most CNC milling machines (also referred to as machining centers) are computer controlled vertical mills having the ability to move the spindle vertically along the z-axis. CNC machines can exist in virtually any of the forms of manual machinery and the most advanced CNC milling-machine, the multi-axis machine, adds two more axes in addition to the three normal axes (xyz). The operating system of such machines is typically a closed loop system that functions on feedback obtained during milling operations. These machines were developed from the basic NC (NUMERIC CONTROL) machines, the computerized forms of which are referred to as CNC machines. A set of programmed instructions is used to guide the machine for desired operations. A CNC machine may be operated by a single operator called a programmer, and is capable of performing various operations automatically and economically.

Figure 1B:
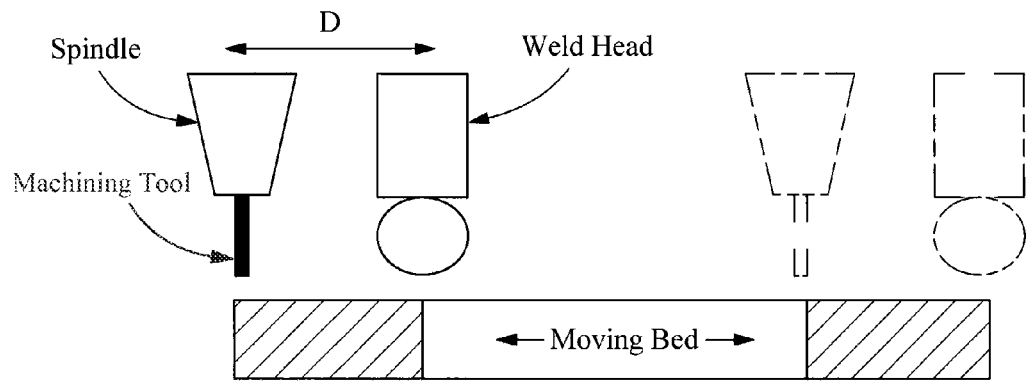
Figure 2:
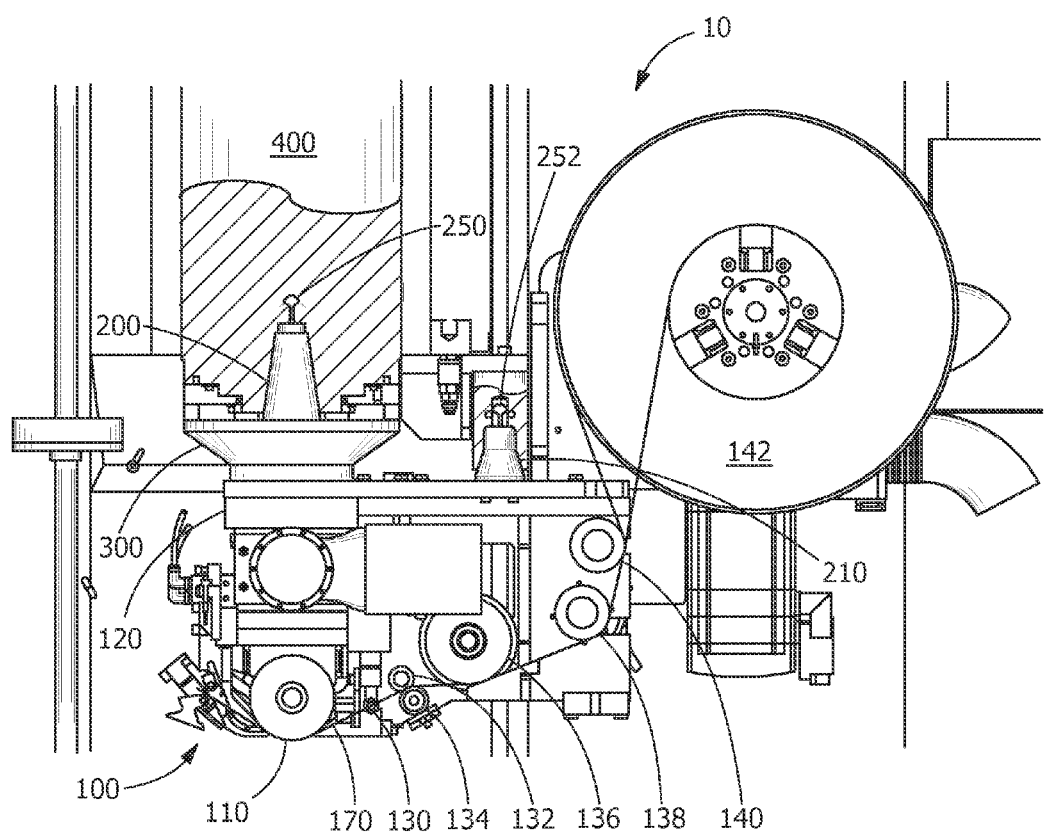
FIG. 2 is a side view of a weld assembly, in accordance with an exemplary embodiment of the present invention, wherein the weld assembly is adapted to be mounted on the spindle of a CNC milling machine.

As previously indicated, and with reference to FIGS. 1a-b, the physical distance between the centerline of the machining spindle and the centerline of the weld head in standard UAM machines creates two zones on the x-y table that cannot be accessed by both pieces of equipment (i.e., the machining tool and the weld held). Thus, a wasted zone of travel equal to two times the distance between the centerline of the machining spindle and the centerline of the weld head is created by this configuration, which significantly limits the size of the parts that may be built using these UAM machines. With reference to FIG. 2, the present invention includes a removable assembly 10 that mounts on a standard CNC machining spindle. Weld assembly 10 may be both mounted and removed as if it were a standard CNC machining tool. Thus, in this invention, the centerline of the spindle and the weld head are collocated. This configuration creates significant more useable table space, thereby maximizing the size of parts that can be built using a UAM machine that includes the weld assembly of the present invention.

Figure 3:
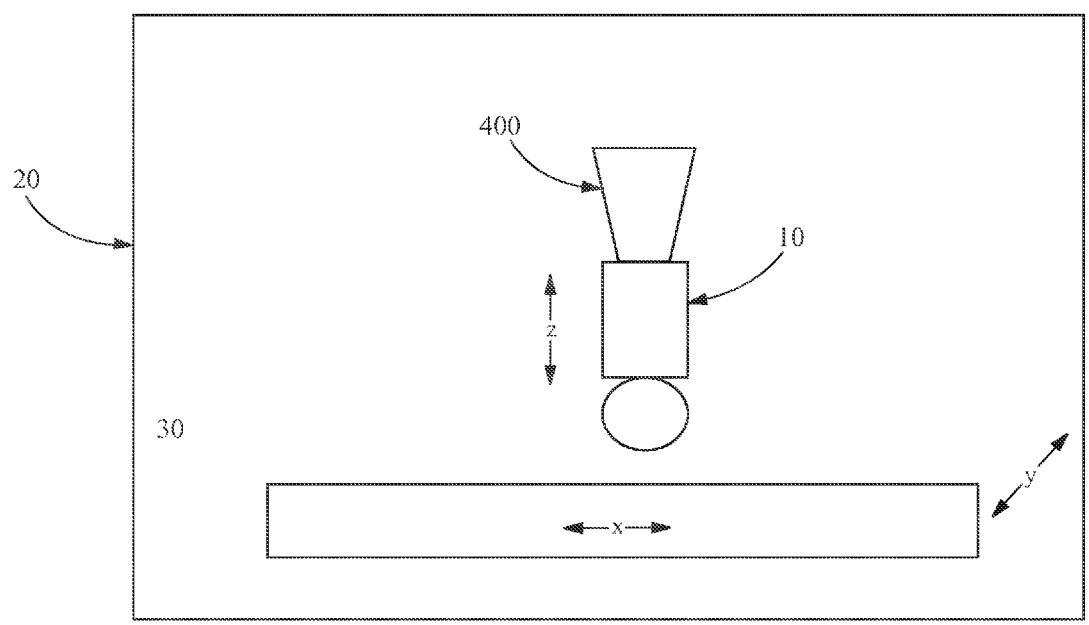
FIG. 3 is a schematic illustration of a milling machine, in accordance with an exemplary embodiment of the present invention.

With reference to FIG. 3, in one embodiment, a system includes a milling machine 20 and a weld assembly 10. The milling machine 20 further includes a spindle 400 adapted to receive a milling tool, wherein the spindle 400 is capable of moving in the z-axis direction, and a table 30 positioned beneath the spindle 400, wherein the table 30 is capable of moving in the x-axis direction and the y-axis direction. The weld assembly 10 is adapted to be mounted on the spindle 400 of the milling machine 20.

Again with reference to FIG. 2, an exemplary embodiment of weld assembly 10 includes weld head subassembly 100 that further includes VHP (very high power) UAM weld head 110; load frame 120, which includes an integral load cell for transfer/measurement of vertical force; a custom tape feed apparatus that includes guillotine 130, for cutting tapes; idler 132; driven nib roller 143, for pulling/pushing tape to a weld horn; idler 136, for material alignment in and out of page; roller 138, with an integrated load cell for measuring tape tension; idler 140; servo-driven reel 142 for feeding tape and applying tension to the tape during welding; foil feedstock 170 for the UAM process; primary CNC tapered tool shank 200 (standard CAT 50 tool holder); secondary tool shank 210 (modified/shortened CAT 50 tool holder); draw stud 250 (for a standard CAT 50 CNC tool holder or the like); secondary draw stud 252; mating collar 300; and spindle 400 (from an industrial CNC machine). With regard to spindle 400, a typical CNC spindle is not designed for nor capable of taking the thrust load needed to make UAM welds (e.g., about 5000 lbs). In this invention, the required thrust load is transferred from weld head 110 to the z-axis of the UAM machine through tapered mating collar 300 that surrounds spindle 400. Spindle draw stud 250 is used to pull weld head 110 into proper position and mating collar 300 transfers load from weld head 110 to the main frame of the UAM machine z-axis without transferring load through spindle 400. As will be appreciated by one of ordinary skill in the art, mating collar 300 may be manufactured from steel or aluminum or other suitable metals and includes: (i) a predetermined surface area that effectively achieves sufficient load transfer; (ii) parallelism to the UAM machine z-axis to prevent side loading; and (iii) substantial flatness of the top surface thereof for even load transfer.

As previously indicated, a primary purpose of this invention is to maximize the usage of the CNC motion axis and thereby maximize the size of parts that can be created with UAM machines. By way of example, on the SonicLayer® 4000 machine (Fabrisonic LLC; Columbus, Ohio) the useable stroke was increased from about 20 inches to about 40 inches, which allowed various custom parts to be built that otherwise would not fit on the machine. The custom parts included a large heat exchanger measuring 18 inches×36 inches that is filled with complex three dimensional internal passages/channels that must be maintained with a high degree of accuracy due to narrow widths of 0.020 inches. The sealing of these channels with layered UAM must be continuous or leaks may occur under operation of the heat exchanger at 1800 PSI. Armor panels may also be built using the present invention. Such panels are built as large as possible because they cannot be welded together after they are created. Using this invention, the added stroke of the SonicLayer 4000 allows for 24 inch×40 inch panels to be built. Productivity on smaller parts is also increased. For example, if it is desired to next 6 inch×6 inch parts, the configuration of this invention allows 24 parts to be built at one time, as opposed to 12 parts at one time. Unattended use of such UAM machines is possible, thereby maximizing their use over various production runs.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed is:

1. A system for ultrasonic additive manufacturing processes, comprising:
   (a) a milling machine, wherein the milling machine further includes:
      (i) a main frame, wherein the main frame includes a z-axis;
      (ii) a spindle adapted to receive a milling tool, wherein the spindle is mounted to the main frame, wherein the spindle includes a bottom surface, and wherein the spindle is capable of moving in the z-axis direction; and
      (iii) a table positioned beneath the spindle, wherein the table is capable of moving in the x-axis direction and the y-axis direction; and
   (b) an ultrasonic additive manufacturing weld assembly, wherein the ultrasonic additive manufacturing weld assembly is adapted to be mounted on the spindle of the milling machine, wherein the ultrasonic additive manufacturing weld assembly generates thrust loads when in use for ultrasonic additive manufacturing, and wherein the ultrasonic additive manufacturing weld assembly further includes:
      (i) an ultrasonic additive manufacturing weld head;
      (ii) a tapered tool shank, wherein the tapered tool shank is adapted to connect the ultrasonic additive manufacturing weld assembly to the spindle; and
      (iii) a z-axis, thrust load transferring tapered mating collar disposed between the ultrasonic additive manufacturing weld head and the tapered tool shank,
         a) wherein the tapered mating collar includes a top portion and a bottom portion,
         b) wherein the top portion of the tapered mating collar is greater in length than the bottom portion of the tapered mating collar,
         c) wherein the top portion of the tapered mating collar directly contacts the spindle,
         d) wherein the bottom portion of the tapered mating collar is mounted to the ultrasonic additive manufacturing weld head, and
         e) wherein the tapered mating collar transfers the thrust loads generated by the ultrasonic additive manufacturing weld head to the z-axis of the main frame without transferring load through the spindle.

2. The system of claim 1, wherein the ultrasonic additive manufacturing weld assembly is exchangeable with a milling tool.

3. The system of claim 1, further comprising a source of metal foil tape in communication with the ultrasonic additive manufacturing weld head.

4. The system of claim 2, further comprising an apparatus for feeding the metal foil tape to the ultrasonic additive manufacturing weld head during ultrasonic additive manufacturing processes.

5. The system of claim 1, further comprising a draw stud disposed between the spindle and the tapered tool shank, wherein the draw stud is operative to properly position the ultrasonic additive manufacturing weld head.

6. The system of claim 1, further comprising a second tapered tool shank for mounting the ultrasonic additive manufacturing weld assembly on the milling machine.

7. The system of claim 6, further comprising a second draw stud disposed between the second tapered tool shank and the milling machine.

8. The system of claim 1, wherein the milling machine is a computer numerical controlled milling machine.

9. A system for ultrasonic additive manufacturing processes, comprising:
   (a) a computer numerical controlled milling machine, wherein the computer numerical controlled milling machine further includes:
      (i) a main frame, wherein the main frame includes a z-axis;
      (ii) a spindle adapted to receive a milling tool, wherein the spindle is mounted to the main frame, wherein the spindle includes a bottom surface, and wherein the spindle is capable of moving in the z-axis direction; and
      (iii) a table positioned beneath the spindle, wherein the table is capable of moving in the x-axis direction and the y-axis direction; and
   (b) an ultrasonic additive manufacturing weld assembly, wherein the ultrasonic additive manufacturing weld assembly is adapted to be mounted on the spindle of the milling machine, wherein the ultrasonic additive manufacturing weld assembly generates thrust loads of about 5000 pounds when in use for ultrasonic additive manufacturing, and wherein the ultrasonic additive manufacturing weld assembly further includes:
      (i) an ultrasonic additive manufacturing weld head;
      (ii) a tapered tool shank, wherein the tapered tool shank is adapted to connect the ultrasonic additive manufacturing weld assembly to the spindle; and
      (iii) a z-axis, thrust load transferring tapered mating collar disposed between the ultrasonic additive manufacturing weld head and the tapered tool shank,
         a) wherein the tapered mating collar includes a top portion and a bottom portion,
         b) wherein the top portion of the tapered mating collar is greater in length than the bottom portion of the tapered mating collar,
         c) wherein the top portion of the tapered mating collar directly contacts the spindle,
         d) wherein the bottom portion of the tapered mating collar is mounted to the ultrasonic additive manufacturing weld head, and
         e) wherein the tapered mating collar transfers the thrust loads generated by the ultrasonic additive manufacturing weld head to the z-axis of the main frame without transferring load through the spindle; and
   (c) a source of metal foil tape in communication with the ultrasonic additive manufacturing weld head.

10. The system of claim 9, wherein the ultrasonic additive manufacturing weld assembly is exchangeable with a milling tool.

11. The system of claim 9, further comprising an apparatus for feeding the metal foil tape to the ultrasonic additive manufacturing weld head during ultrasonic additive manufacturing processes.

12. The system of claim 9, further comprising a first draw stud disposed between the spindle and the tapered tool shank, wherein the first draw stud is operative to properly position the ultrasonic additive manufacturing weld head.

13. The system of claim 9, further comprising a second tapered tool shank for mounting the ultrasonic additive manufacturing weld assembly on the milling machine.

14. The system of claim 13, further comprising a second draw stud disposed between the second tapered tool shank and the milling machine.

15. A system for ultrasonic additive manufacturing processes, comprising:
(a) a milling machine, wherein the milling machine further includes:
  (i) a main frame, wherein the main frame includes a z-axis;
  (ii) a spindle adapted to receive a milling tool, wherein the spindle is mounted on the main frame, wherein the spindle includes a bottom surface, and wherein the spindle is capable of moving in the z-axis direction; and
  (iii) a table positioned beneath the spindle, wherein the table is capable of moving in the x-axis direction and the y-axis direction; and
(b) an ultrasonic additive manufacturing weld assembly, wherein the ultrasonic additive manufacturing weld assembly is adapted to be mounted on the spindle of the milling machine, wherein the ultrasonic additive manufacturing weld assembly generates thrust loads of about 5000 pounds when in use for ultrasonic additive manufacturing, and wherein the ultrasonic additive manufacturing weld assembly further includes:
  (i) an ultrasonic additive manufacturing weld head;
  (ii) a tapered tool shank, wherein the tapered tool shank is adapted to connect the ultrasonic additive manufacturing weld assembly to the spindle; and
  (iii) a z-axis, thrust load transferring tapered mating collar disposed between the ultrasonic additive manufacturing weld head and the tapered tool shank,
    a) wherein the tapered mating collar includes a top portion and a bottom portion,
    b) wherein the top portion of the tapered mating collar is greater in length than the bottom portion of the tapered mating collar,
    c) wherein the top portion of the tapered mating collar directly contacts the spindle,
    d) wherein the bottom portion of the tapered mating collar is mounted to the ultrasonic additive manufacturing weld head, and
    e) wherein the tapered mating collar transfers the thrust loads generated by the ultrasonic additive manufacturing weld head to the z-axis of the main frame without transferring load through the spindle; and
(c) a source of metal foil tape in communication with the ultrasonic additive manufacturing weld head; and
(d) an apparatus for feeding the metal foil tape to the ultrasonic additive manufacturing weld head during ultrasonic additive manufacturing processes.

16. The system of claim 15, wherein the ultrasonic additive manufacturing weld assembly is exchangeable with a milling tool.

17. The system of claim 15, further comprising a first draw stud disposed between the spindle and the tapered tool shank, wherein the first draw stud is operative to properly position the ultrasonic additive manufacturing weld head.

18. The system of claim 15, further comprising a second tapered tool shank for mounting the ultrasonic additive manufacturing weld assembly on the milling machine.

19. The system of claim 18, further comprising a second draw stud disposed between the second tapered tool shank and the milling machine.

20. The system of claim 15, wherein the milling machine is a computer numerical controlled milling machine.

* * * * *